(12) United States Patent
Amatruda et al.

(10) Patent No.: US 8,925,272 B1
(45) Date of Patent: *Jan. 6, 2015

(54) ROOFING SHINGLES WITH REDUCED USAGE OF CONVENTIONAL SHINGLE MATERIAL HAVING SIDE LAP EXTENSION

(71) Applicants: Anna M. Amatruda, East Norriton, PA (US); Peter Chihlas, Lansdale, PA (US); Robert L. Jenkins, Honey Brook, PA (US); Stephen A. Koch, Collegeville, PA (US); Jennifer A. Millberg, Boston, MA (US); Richard A. Snyder, Eagleville, PA (US); Dale H. Walton, Royersford, PA (US)

(72) Inventors: Anna M. Amatruda, East Norriton, PA (US); Peter Chihlas, Lansdale, PA (US); Robert L. Jenkins, Honey Brook, PA (US); Stephen A. Koch, Collegeville, PA (US); Jennifer A. Millberg, Boston, MA (US); Richard A. Snyder, Eagleville, PA (US); Dale H. Walton, Royersford, PA (US)

(73) Assignee: Certainteed Corporation, Valley Forge, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,349

(22) Filed: Nov. 2, 2012

Related U.S. Application Data

(60) Provisional application No. 61/555,346, filed on Nov. 3, 2011.

(51) Int. Cl.
E04D 1/26 (2006.01)
(52) U.S. Cl.
CPC ........................................ *E04D 1/26* (2013.01)
USPC .......................................................... 52/557

(58) Field of Classification Search
USPC ........... 52/557, 558, 559, 554, 105, 585, 314, 52/518, 543, 552, 540, DIG. 16; 83/920; D25/139
See application file for complete search history.

(56) References Cited

U.S. PATENT DOCUMENTS

| 1,340,348 | A | 5/1920 | Rahr |
| 2,013,556 | A | 9/1935 | Eckert |
| 3,415,029 | A | 12/1968 | Coletta |

(Continued)

FOREIGN PATENT DOCUMENTS

CA 363127 A 5/1937

OTHER PUBLICATIONS

U.S. Appl. No. 13/667,418, filed Nov. 2, 2012, Inventors: Anna M. Amatruda et al.

(Continued)

*Primary Examiner* — William Gilbert
*Assistant Examiner* — Kyle Walraed-Sullivan
(74) *Attorney, Agent, or Firm* — Alexander H. Plache; Abel Law Group, LLP

(57) ABSTRACT

A roofing shingle includes a shingle body having a buttlap portion with a butt edge and a headlap portion with a head edge. The shingle body also has a first side edge, a second side edge, and an exposure zone extending from the butt edge toward the headlap portion that is configured to be exposed to the environment when the shingle is installed on a roof. A water impermeable sheet is attached to the shingle body. The sheet has a width, length, first end and second end. The width extends from approximately the head edge to approximately the butt edge of the shingle body. The length extends from the first end to the second end. At least a portion of the length extends beyond the first side edge of the shingle body by at least about 2 inches. The sheet is formed from a different material than the shingle body.

10 Claims, 12 Drawing Sheets

(56) References Cited

U.S. PATENT DOCUMENTS

| | | | |
|---|---|---|---|
| 4,010,590 A | 3/1977 | Reinke | |
| 4,023,321 A | 5/1977 | Smith | |
| 4,050,209 A | 9/1977 | Barker et al. | |
| 4,102,107 A | 7/1978 | Barker et al. | |
| 4,194,335 A * | 3/1980 | Diamond | 52/419 |
| 4,352,837 A | 10/1982 | Kopenhaver | |
| 4,459,788 A | 7/1984 | Bockwinkel et al. | |
| 4,706,435 A * | 11/1987 | Stewart | 52/533 |
| 4,731,970 A | 3/1988 | Marshall et al. | |
| 5,094,058 A | 3/1992 | Slocum | |
| 5,181,361 A | 1/1993 | Hannah et al. | |
| 5,287,669 A | 2/1994 | Hannah et al. | |
| 5,295,339 A | 3/1994 | Manner | |
| 5,347,785 A | 9/1994 | Terrenzio et al. | |
| 5,375,491 A | 12/1994 | Hannah et al. | |
| 5,421,134 A | 6/1995 | Hannah et al. | |
| 5,426,902 A | 6/1995 | Stahl et al. | |
| 5,428,931 A | 7/1995 | Ragsdale | |
| 6,708,456 B2 | 3/2004 | Kiik et al. | |
| 6,877,288 B2 * | 4/2005 | Shirota | 52/416 |
| 6,936,329 B2 * | 8/2005 | Kiik et al. | 428/141 |
| 6,990,779 B2 | 1/2006 | Kiik et al. | |
| 7,448,177 B2 | 11/2008 | McClintick | |
| 7,454,873 B2 | 11/2008 | McClintick | |
| 7,537,820 B2 | 5/2009 | Kalkanoglu et al. | |
| 8,557,366 B2 | 10/2013 | Harrington et al. | |
| 8,667,758 B2 | 3/2014 | Fernandez Fernandez | |
| 2003/0097811 A1 | 5/2003 | Becker et al. | |
| 2003/0230040 A1 | 12/2003 | Shirota | |
| 2004/0182032 A1 | 9/2004 | Koschitzky | |
| 2006/0059832 A1 | 3/2006 | McClintick | |
| 2006/0201094 A1 | 9/2006 | Lassiter | |
| 2007/0039274 A1 * | 2/2007 | Harrington et al. | 52/518 |
| 2007/0042158 A1 | 2/2007 | Belt et al. | |
| 2007/0094976 A1 | 5/2007 | McClintick | |
| 2007/0151171 A1 | 7/2007 | McClintick | |
| 2008/0155923 A1 | 7/2008 | Teng et al. | |
| 2011/0041446 A1 | 2/2011 | Stephens et al. | |
| 2011/0061326 A1 | 3/2011 | Jenkins | |

OTHER PUBLICATIONS

U.S. Appl. No. 13/667,443, filed Nov. 2, 2012, Inventors: Anna M. Amatruda et al.
Technical search, 4 pgs, 2012.
Technical search, 7 pgs, 2012.

* cited by examiner

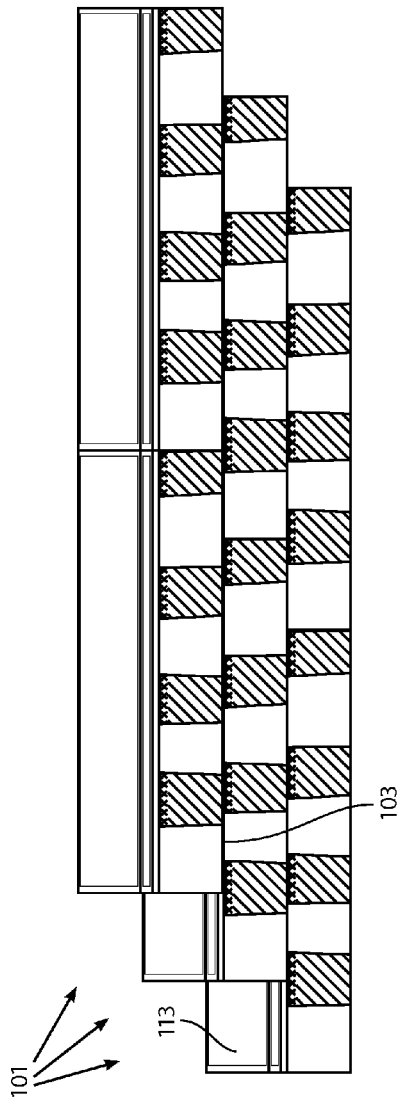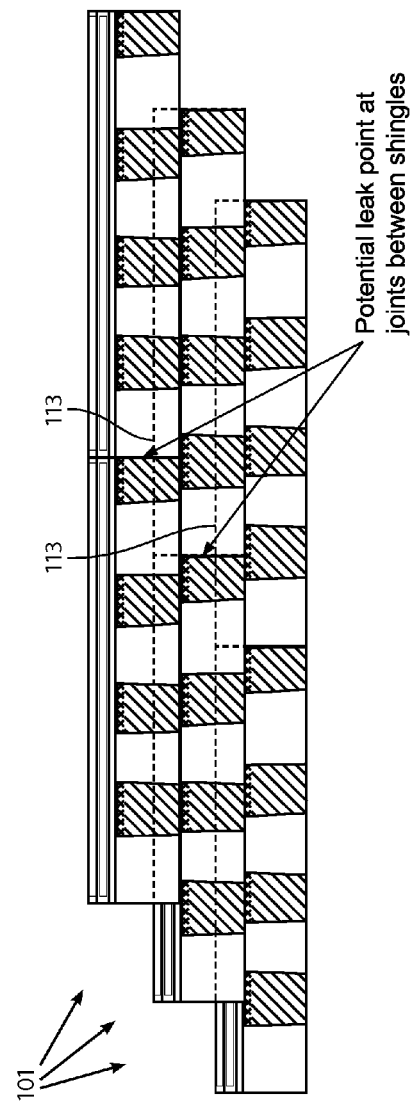

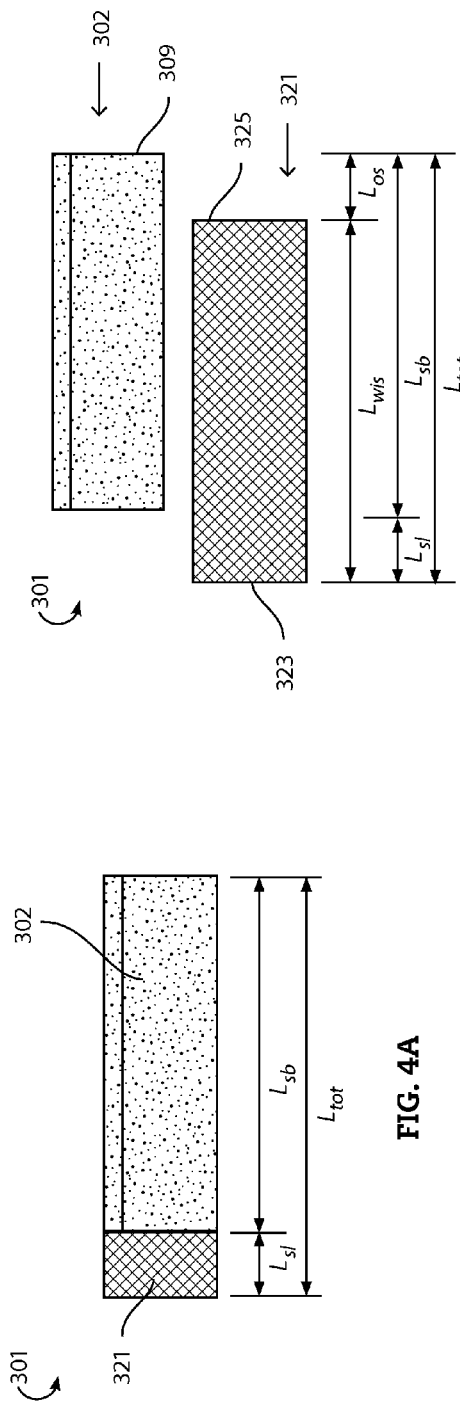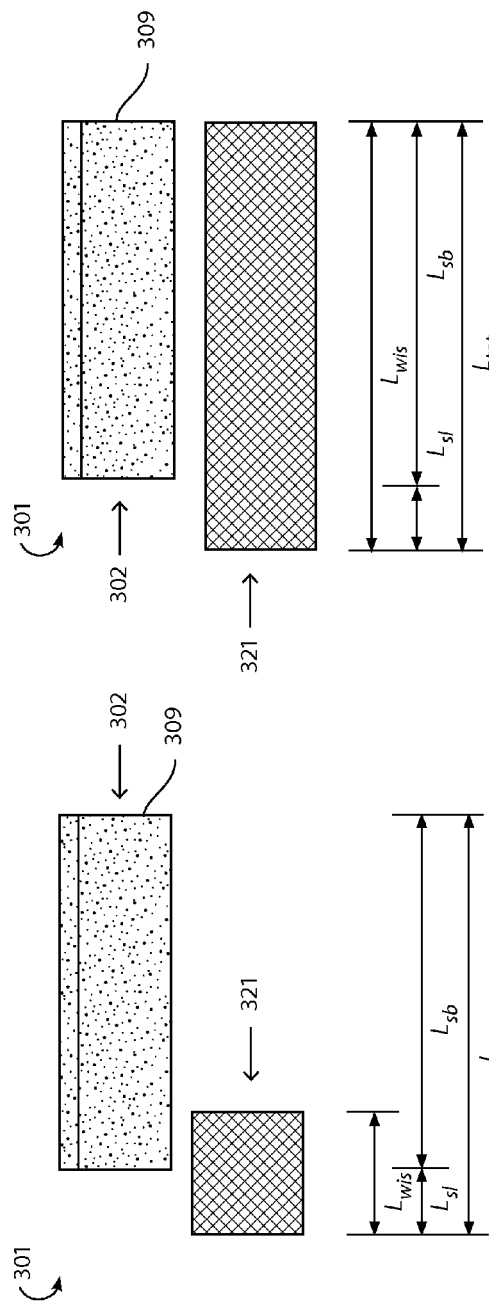
FIG. 4A  FIG. 4B  FIG. 4C  FIG. 4D

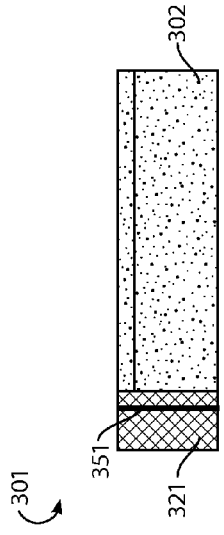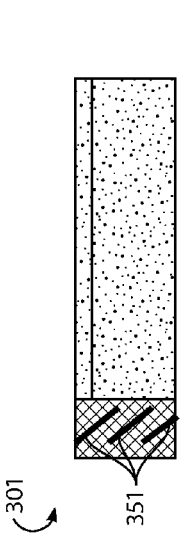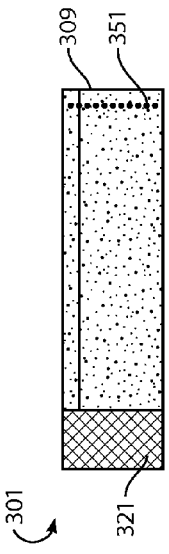
FIG. 5A
FIG. 5B
FIG. 5C
FIG. 5D
FIG. 5E

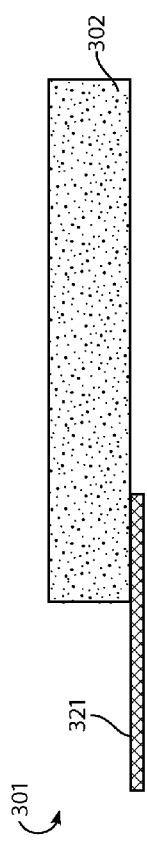
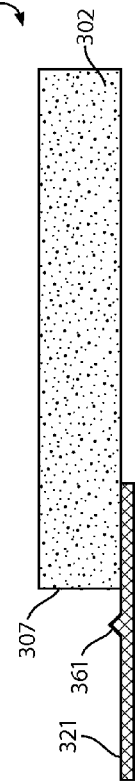
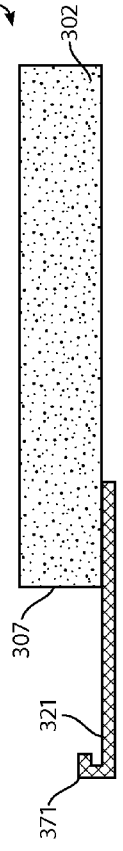
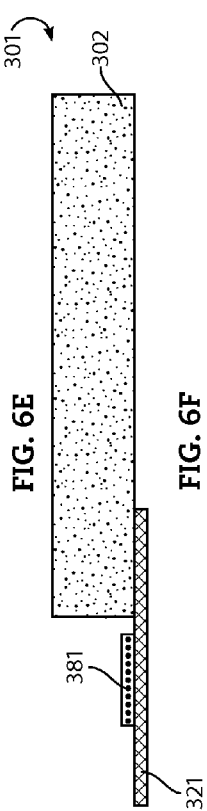

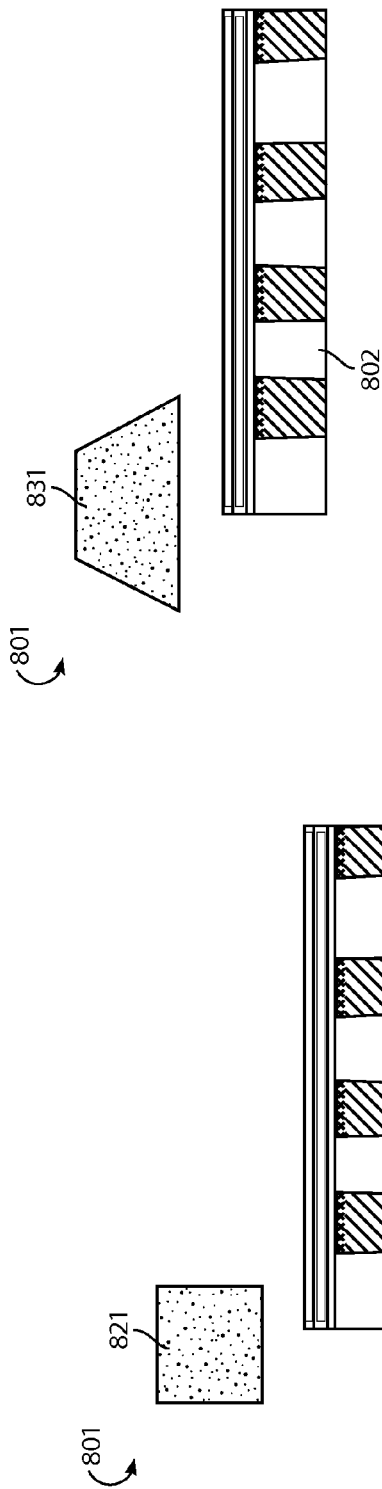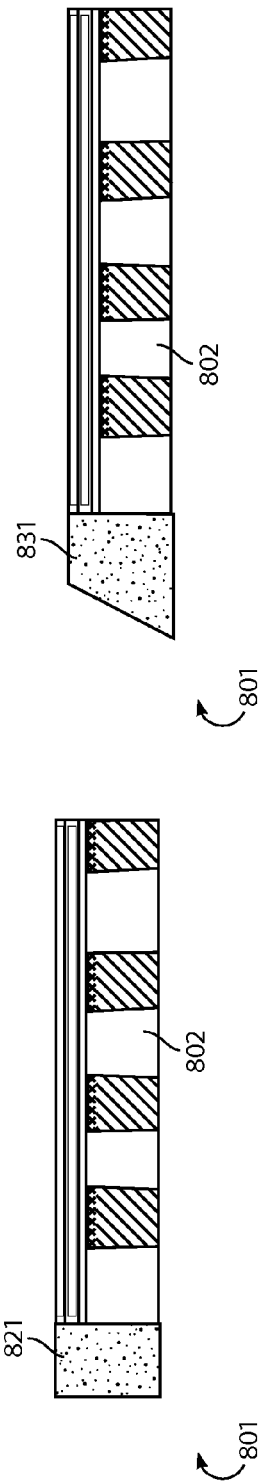
FIG. 8A  FIG. 8B  FIG. 8C  FIG. 8D

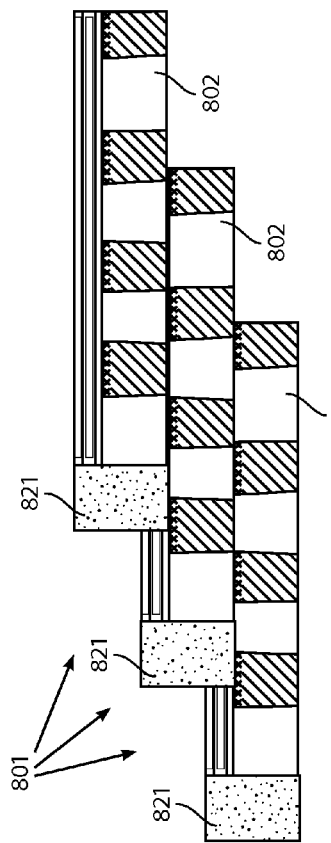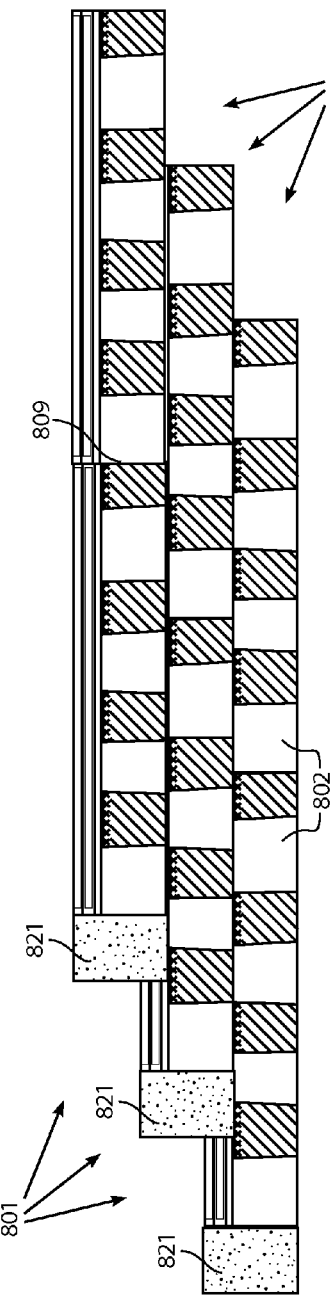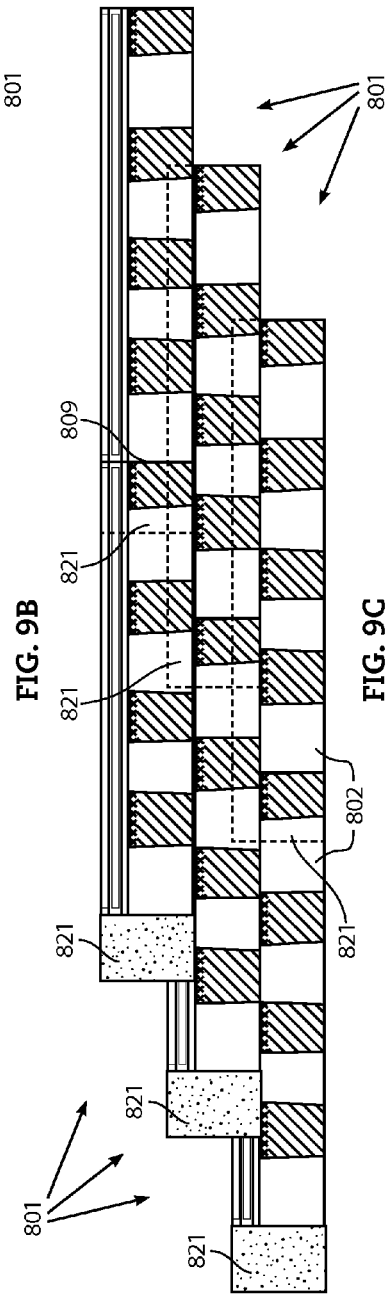

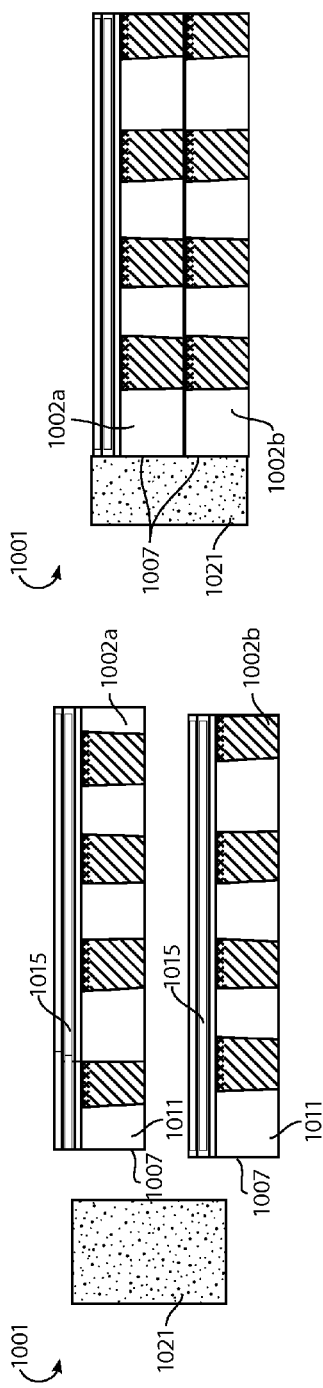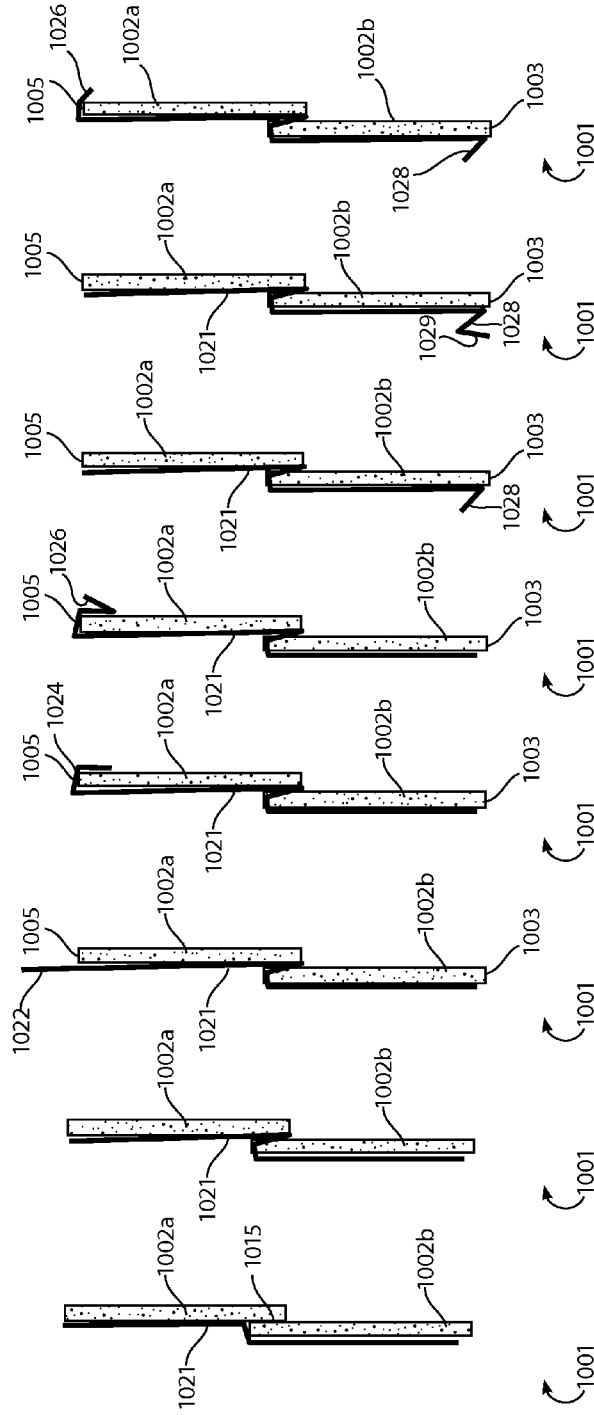

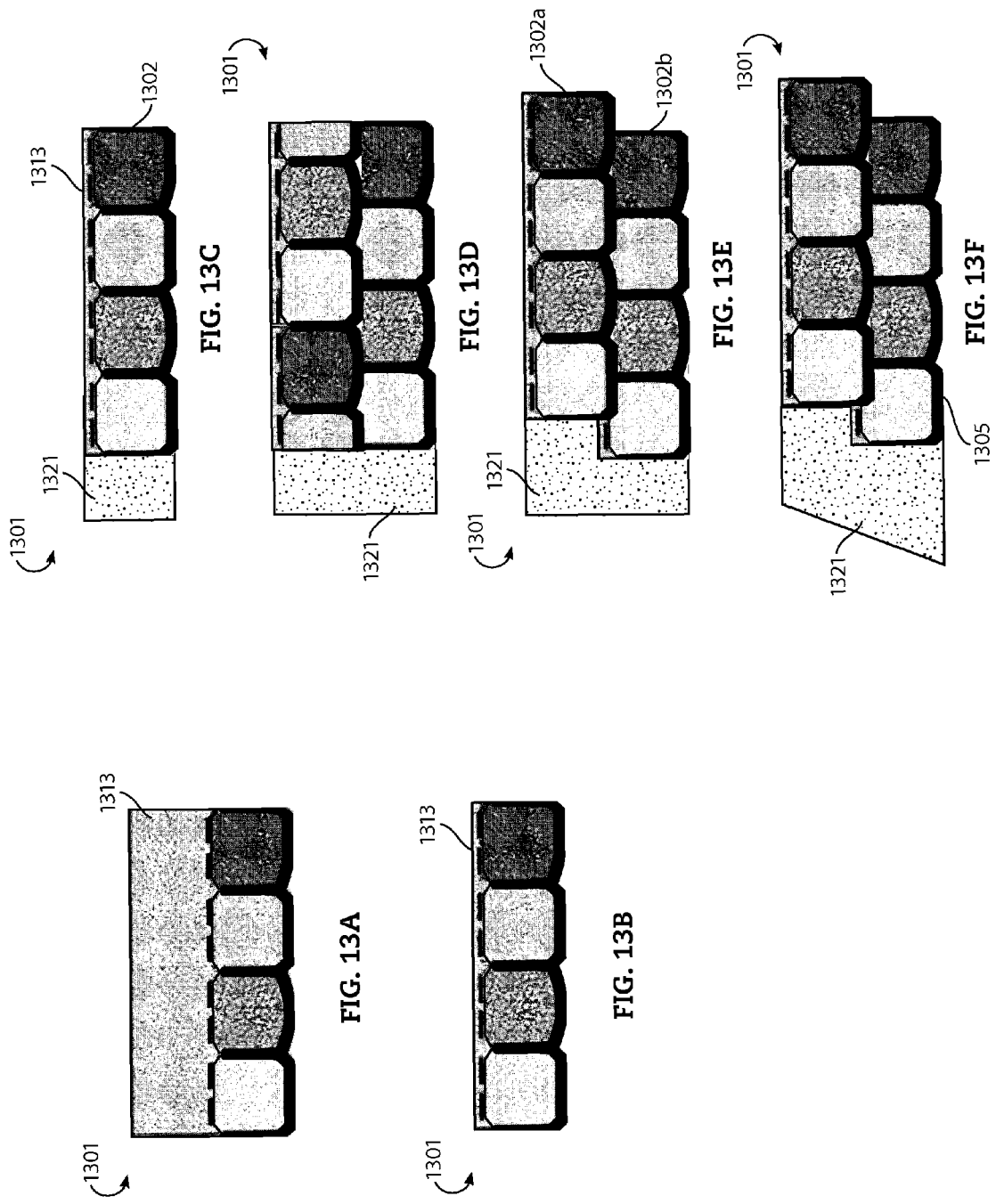

ROOFING SHINGLES WITH REDUCED USAGE OF CONVENTIONAL SHINGLE MATERIAL HAVING SIDE LAP EXTENSION

This application claims priority to and the benefit of U.S. Provisional Patent Application No. 61/555,346, filed Nov. 3, 2011, which is incorporated herein by reference in its entirety.

BACKGROUND OF THE INVENTION

Field of the Disclosure

In the art of shingle and siding manufacture, it is known to manufacture shingles of an asphalt impregnated organic or inorganic web, having granules on an outer surface thereof, and having smaller particles on an opposite surface, comprising complete layers of shingle material, examples of which are present in U.S. Pat. Nos. 4,352,837; 5,181,361; 5,287,669; 5,347,785; 5,375,491; 5,421,134; 5,426,902, as well as many other patents. Sometimes, these shingles are comprised of a plurality of complete layers of shingle material, adhered together as a laminate, and sometimes they are comprised of a single complete layer of shingle material, with or without an overlay comprised of an additional layer of adhesive, and an additional layer of granules applied thereto. In addition to structures such as the above identified shingles functioning as shingles, sometimes similar structures are used to function as components of siding, to be applied to side walls of a building structure, rather than the roof of a building structure.

An object of the invention is to provide a roofing shingle product having reduced usage of conventional shingle materials while still closing a roof to protect a structure from the environment. Simply eliminating a headlap portion of a shingle and leaving the fastening zone and exposure zone in place for installation and application of shingles can produce the appearance and aesthetic effect of a shingled roof. However, typical headlaps extend above the exposure zone to a distance higher than the first overlying course of shingles and to a point where they at least in part underlie the lower end of the second overlying course of shingles. Removal of a significant portion of the headlap can leave potential leak points between pairs of adjacent shingles where no shingle material is beneath a joint between adjacent shingles. This invention provides a solution to the problem of closing a shingle installation using shingles having exposure zones of conventional shingle materials and reduced amounts of conventional material above the exposure zone.

US 20070039274A1 discloses a roofing shingle includes a buttlap portion with a butt edge and a headlap portion with a head edge. The roofing shingle includes a coated mat which is a roofing mat coated with an organic-based coating material. The roofing shingle also includes a water impermeable sheet adjacent to the coated mat. In one embodiment, the headlap portion of the coated mat is mostly replaced by the sheet. In another embodiment, the roofing shingle has a limited width. In a further embodiment, the roofing shingle is reduced in weight compared to a conventional shingle U.S. Pat. No. 6,708,456 discloses roofing composite comprising a roofing material and an interply material attached to the roofing material. The interply material is attached adjacent to an edge of the roofing material and is scored to permit a major portion of the interply material to be folded away from the roofing material for application to a roof. The roofing material may be a roofing shingle or roll roofing and the interply material is comprised of a water resistant material.

U.S. Pat. No. 6,936,329 discloses a fastener-free composite roofing product comprising a roofing material and an interply material attached to the roofing material, wherein the interply material includes an adhesive coating on one side. The interply material is attached adjacent to an edge of the roofing material to permit a major portion of the interply material to be folded away from the roofing material for application to a roof. The adhesive is effective to secure the roofing product to the roof without the use of nails or other fasteners. The roofing material may be a roofing shingle or roll roofing, and the interply material is comprised of a water resistant material.

U.S. Pat. No. 6,990,779 discloses a roofing system having a multiplicity of courses of roofing shingles and interply material having at least one course of interply material overlapping at least about ten percent of a first course of shingles and a second course of shingles overlapping at least a portion of the interply material and the first course of shingles. More than about 40% of the first course of shingles is exposed after installation. The roofing system has a class A fire resistant rating. Roofing shingles having utility in this disclosure also are disclosed. In preferred embodiments the shingles have an exposure width of at least about 60% of the shingle, more preferably at least about 64% of the width of the shingle.

US 20040182032A1 discloses a multi-layer laminate shingle having a base layer and at least a second layer above the base layer. At one end of the shingle the base layer projects beyond the second layer while at the other end the second layer projects beyond the base layer. When the shingles are laid in a course along the roof, the projecting end of the second layer overlaps the projecting end of the base layer of the next shingle, forming a shiplap joint over all or substantially all of the width of the shingle, protecting the joint against rain penetration. This shiplap feature allows the headlap to exposure ratio of the shingle to be reduced to less than 1 and even to 0.5 or less, thus reducing the cost of shingles per unit of roof coverage area. If desired, a narrow strip can be adhered to the top of the headlap portion of the shingle or beneath the butt portion of the shingle to emulate the appearance of a costly triple laminate shingle.

U.S. Pat. No. 4,459,788 discloses a wood shingle panel including an elongated backing sheet and a face layer adhesively bonded together, the face layer being composed of a double course of half-length shingle sections formed by severing standard full-length tapered wood shingles midway between their tip and butt ends. The butt end portions of the tip shingle sections are located adjacent to the lower longitudinal edge of the backing sheet and the tip end portions of the butt shingle sections are located adjacent to the upper longitudinal edge of the backing sheet. The butt end portions of the butt shingle sections are arranged along the central portion of the backing sheet and overlie the tip end portions of the tip shingle sections. The butt end portions of the butt shingle sections are rabbeted for receiving the tip end portions of the tip shingle sections in the rabbet. The lower margin of the backing sheet may be rabbeted beneath the butt portions of the tip shingle sections to overlap the upper margin of the next lower panel.

U.S. Pat. No. 5,094,058 discloses a roofing shingle having a body portion of generally flat, four-sided polygonal configuration and relatively thin in thickness. The body portion is provided with a plurality of irregular corrugations or otherwise deformed to give the roofing shingle the appearance of natural wood or other natural material such as slate. The body portion has a channel formed in the under surface so that the upper surface forms a ridge extending substantially parallel to the upper edge of the body portion. The body portion is also provided adjacent each of the opposite side or vertical edges with raised portions which are so shaped and dimensioned as to have one raised portion nest within the raised portion of a next adjacent like roofing shingle. The ridge and nested raised portions form barriers to water infiltration between the overlapping shingles.

In U.S. Pat. No. 4,731,970 a shingled panel for covering the exterior of structures is disclosed which includes a base sheet having at least one, and preferably multiple courses of shingles secured thereto. The lowest course of shingles are positioned over a water resistant membrane strip having an opening through which the shingles are glued directly to the base sheet. Each higher course of shingles has a membrane strip thereunder which terminates short of the bottom of each shingle in that course so that glue bond between the lower portion of each shingle in that course and the shingles in the next lower course can be achieved. Side-to-side sealing of adjacent panels is effected by the end shingles in alternate courses of shingles extending beyond the edges of the panel, while the end shingles in the same courses at the opposite ends similarly are laterally recessed from the edges of the panel. Moreover, laterally recessed end shingles have a thickness dimension greater than laterally protruding end shingles to facilitate nesting of shingles from laterally adjacent panels in overlapped, side-by-side relation across the joint between adjacent panels.

US 20060059832A1, US 20070094976A1, US 20070151171A1, U.S. Pat. No. 7,448,177 and U.S. Pat. No. 7,454,873 disclose a slate roofing system with reduced dimension slates having an interlayment approach to closing gaps between tiles.

BRIEF DESCRIPTION OF THE DRAWINGS

FIGS. 1a-1d and 2a-2b are plan views of conventional shingles.

FIGS. 4a-4d, 5a-5e, 6a-6f, 7a-7h and 8a-8d are plan and side views of alternate embodiments of shingles.

FIGS. 9a-9c are plan views depicting installation of courses of embodiments of shingles.

FIGS. 10a-10j are plan and side views of alternate embodiments of shingles.

FIGS. 13a-13f are plan views of alternate embodiments of shingles.

DETAILED DESCRIPTION

In a first aspect, a roofing shingle comprises: a shingle body comprising a buttlap portion with a butt edge and a headlap portion with a head edge, a first side edge and a second side edge, and; a water impermeable sheet adjacent to the shingle body, the sheet having a width and a length, the width extending from the head edge through the butt edge of the shingle body; and the length extending beyond the first side edge of the shingle body. The shingle body has an exposure zone extending upwardly from the butt edge toward the headlap portion that is exposed to the environment when the shingle is installed on a roof and provides weather protection and aesthetic effect to the roof. The shingle body also has a fastening zone that is between the exposure zone and the head edge. The water impermeable sheet extension from the shingle provides a side lapping structure that closes a shingled roof to water penetration.

In a second aspect, the water impermeable sheet has a first end that extends beyond the first side edge such that a first distance between the first end and the first side edge is at least about 10% of a second distance between the first end of the water impermeable sheet and the second side edge.

In a third aspect, the shingle is as described in one of the first two aspects above, wherein, the length of the water impermeable sheet extends approximately to the second side edge of the shingle body, a second end of the water impermeable sheet being proximate the second edge of the shingle body.

In a fourth aspect, the second end of the water impermeable sheet is offset inwardly from the second side edge of the shingle body by an amount comparable to the extension of the first end of the impermeable sheet beyond the first side edge of the shingle body.

In another aspect the shingle body emulates two or more courses of conventional shingles.

In certain embodiments the side lapping structure includes structural elements that have raised portions that result in moisture diverting pathways to direct any moisture that may enter into the joint between two adjacent shingles on a sloped roof in a downward direction so that the roof may drain and not have water enter the building.

In other embodiments, sealants are provided that further close the roof to moisture entrance. In some cases continuous sealants provide a barrier to moisture intrusion. In other cases patterns or structures formed by the sealants provide barriers and drainage pathways to prevent moisture intrusion.

The accompanying drawings will help explain the invention. The drawings are not necessarily to scale, and sizes of various elements can be distorted for clarity.

Figure 1B:
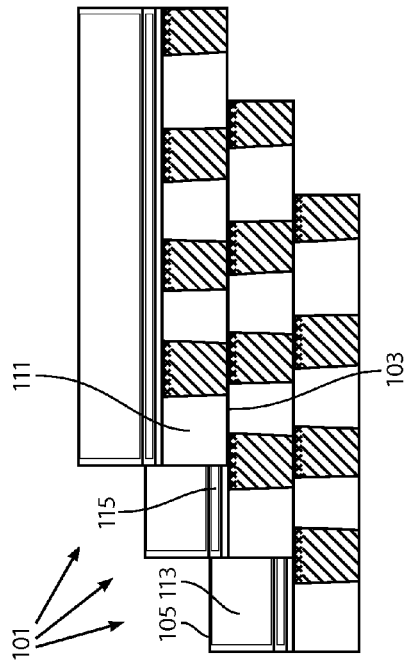
Figure 1D:
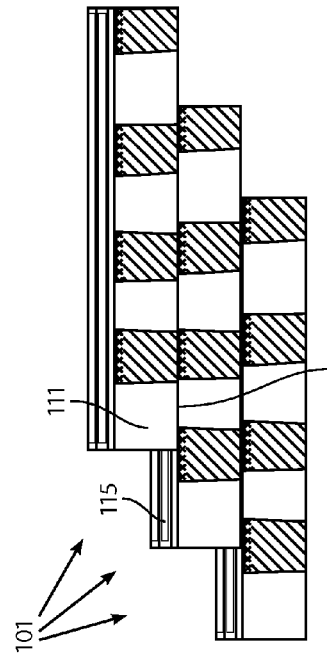
Figure 1A:
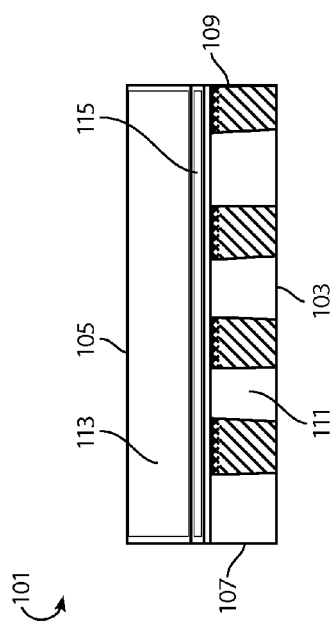

FIG. 1a shows a top view of a typical laminated shingle 101. The shingle 101 has a butt edge 103, a head edge 105 and first and second side edges 107, 109, respectively. The exposure zone 111 is adjacent the butt edge 103. The headlap zone 113 is adjacent the head edge 105. The fastening zone 115 is between the exposure zone 111 and the headlap zone 113. FIG. 1b shows three such shingles 101 arranged in a laterally offset, partially overlapping array, much as would be the case if the shingles 101 were laid up on a roof. The fastening zone 115 of an underlying shingle is covered by the exposure zone 111 near the butt edge 103 of the shingles of the next overlying course. The headlap zone 113 extends upwardly to the head edge 105 such that an upper portion of the headlap zone 113 near the head edge 105 of a shingle of a first course of shingles is underlying the fastening zone 115 of a shingle of a second course of shingles, and also underlying the lower end of the exposure zone 111 of a shingle of a third course of shingles in the arrangement.

Figure 1C:
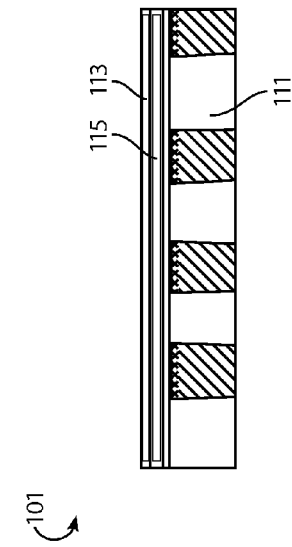

FIG. 1c shows a plan view of a similar laminated shingle 101, but with much of the headlap zone 113 omitted. The fastening zone 115 is above the exposure zone 111. FIG. 1d shows three such shingles 101 arranged in a laterally offset, partially overlapping array much as would be the case if the shingles 101 were laid up on a roof. The fastening zone 115 of an underlying shingle is covered by the exposure zone 111 near the butt edge 103 of the shingles 101 of the next overlying course.

FIG. 2a shows two laterally adjacent shingles 101 of FIG. 1a arranged in three offset courses as in FIG. 1b. FIG. 2b similarly shows three courses of pairs of laterally adjacent shingles 101 arrayed as in FIG. 1d. In FIG. 2a, the headlap zone 113 of the first course extends upwardly beneath the butt edge 103 of the third course. With this arrangement, the joints between adjacent shingles 101 of the second course have the headlap zone 113 of a shingle 101 of the first course underlying the joint so that any water entering the joint will be directed down the roof. Dashed lines in FIG. 2b indicate the outline of the underlying shingles 101 in the array. In FIG. 2b, it is apparent that the headlap portions 113 of an underlying course of shingles 101 do not extend sufficiently upward to provide closure of the shingled roof in the areas of joints between laterally adjacent shingles 101. Such joints would be a potential leak point in the shingled roof where moisture could enter the joint and not be directed away as is would be the case with conventional shingles 101 as shown in FIG. 2a.

Figure 3C:
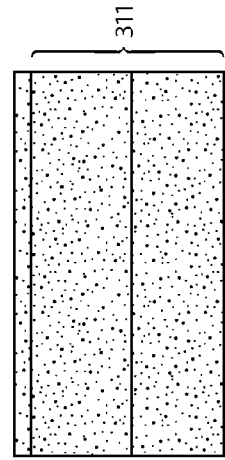
FIGS. 3a-3d are plan views of embodiments of shingles.
Figure 3D:
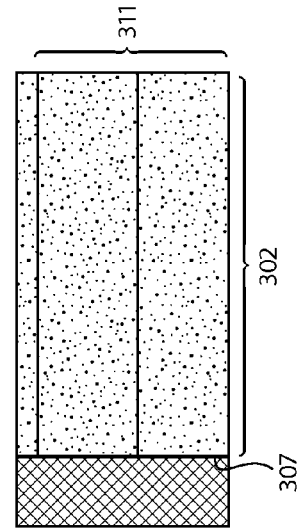
Figure 3A:
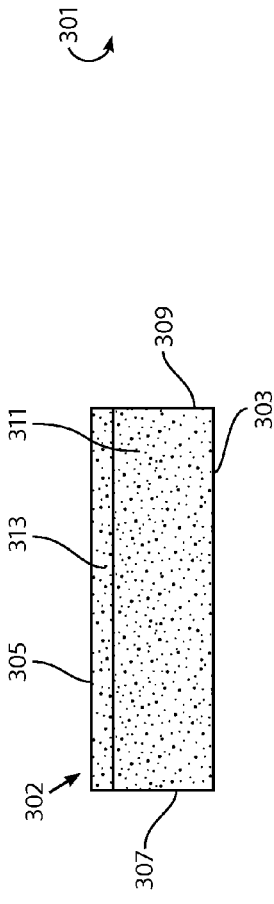
Figure 3B:
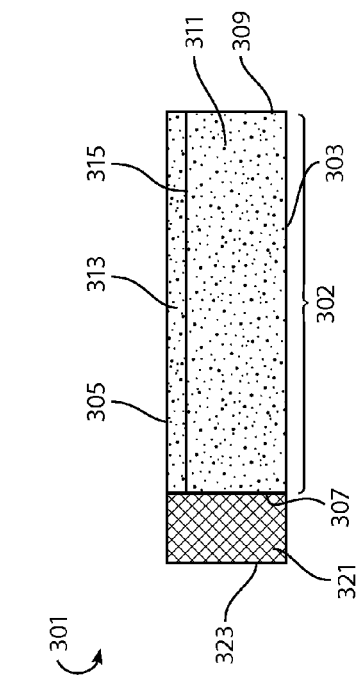

FIG. 3a shows a plan view of a shingle body 302 with a buttlap portion 311 with a butt edge 303 and a short headlap portion 313 with a head edge 305, a first side edge 307 and a second side edge 309. It is similar to the shingle depicted in FIG. 1c, but without aesthetic embellishment so as to suggest that the appearance of the exposure zone could take on any desired appearance. FIG. 3b shows another shingle 301 that further includes a water impermeable sheet 321 attached to the shingle body 302. The sheet 321 has a width and a length, the width extending from the head edge 305 to the butt edge 303 of the shingle body 302; and the length extending beyond the first side edge 307 of the shingle body 302. The shingle body 302 has an exposure zone 311 extending upwardly from the butt edge 303 toward the headlap portion 313 that is exposed to the environment when the shingle 301 is installed on a roof and provides weather protection and aesthetic effect to the roof. The shingle body 302 also has a fastening zone 315 that is between the exposure zone 311 and the head edge 305. The water impermeable sheet 321 is an extension from the shingle body 302 to provide a side lapping structure that closes a shingled roof to water penetration as shown later. In some cases, the water impermeable sheet 321 has a first end 323 that extends beyond the first side edge 307, such that a first distance between the first end 323 and the first side edge 307 is at least about 10% of a second distance between the first end 323 of the water impermeable sheet 321 and the second side edge 309. The shingle body 302 of FIG. 3c is similar to that of 3a, except that the exposure zone 311 takes on the area of two courses of conventional shingles. The shingle 301 of FIG. 3d has an exposure zone 311 for the effect of two courses of shingles and has a water impermeable sheet 323 adjacent to the shingle body 302 with a length extending beyond the first side edge 307 of the shingle body 302. The water impermeable sheet 321 extension from the shingle body 302 provides a side lapping structure that closes a shingled roof to water penetration, and a single shingle provides the effective coverage of two conventional shingles.

FIG. 4 depicts various alternative embodiments of the shingle 301 of FIG. 3B and relative dimensions of various components of such embodiments. The shingle 301 has a water impermeable sheet 321 that forms a side lap and the water impermeable sheet 321 is attached to the shingle body 302 on the rear face of the shingle body 302. In an alternative arrangement where the shingle body 302 is a laminated shingle body, the water impermeable sheet 321 is sandwiched between two layers of the laminated construction at a level farther down in the construction than the front face of the shingle body 302. The overall shingle 301 with the water impermeable sheet 321 has a total length Ltot. The shingle body 302 has a length Lsb. The water impermeable sheet 321 forms a side lap having a length Lsl, the water impermeable sheet 321 itself having a length of Lwis.

The shingle 301 of FIG. 4c has a water impermeable sheet 321 with a length that is substantially shorter than that of the shingle body 302 such that Lwis<Lsb. The water impermeable sheet 321 provides a side lap of length Lsl that, in the installed state, is beneath the second end 309 of the shingle body 302 of a laterally adjacent second shingle 301 behind the shingle body 302 of the first shingle 301, thus providing a closure point for the roof and directing any water entering a joint between adjacent shingle bodies 302 downwardly along the roof. When the water impermeable sheet 321 is attached to the back of the shingle body 302, the lateral offset of sheet 321 behind the second end 309 of the shingle body 302 provides a space for receiving the side lap portion of a laterally adjacent second shingle 301 behind the shingle body 302 of the first shingle 301.

The shingle 301 of FIG. 4b has a water impermeable sheet 321 with a length that is substantially similar to that of the shingle body 302 such that Lwis≈Lsb. The second end 325 of the water impermeable sheet 321 is laterally offset from the second edge 309 of the shingle body 309 by a length Los. For the case where the water impermeable sheet 321 and the shingle body 302 have about the same length, the offset Los is about the same as the length of the side lap Lsl. When the water impermeable sheet 321 is attached to the back of the shingle body 302, the lateral offset of sheet 321 behind the second end 309 of the shingle body 302 provides a space of comparable thickness to the sheet 321 for receiving the side lap portion of a laterally adjacent second shingle 301 behind the shingle body 302 of the first shingle 301, thus providing a closure point for the roof and directing any water entering a joint between adjacent shingle bodies 302 downwardly along the roof.

The shingle 301 of FIG. 4d has a water impermeable sheet 321 with a length that is greater than that of the shingle body 302 such that Lwis>Lsb. In this case, the total length of the shingle 301 including both side lap and shingle body 302 is the same as the length of the water impermeable sheet 321, Ltot=Lwis=Lsl+Lsb. The water impermeable sheet 321 provides a side lap of length Lsl that, in the installed state, is beneath the second end 309 of the shingle body 302 of a laterally adjacent second shingle 301 behind the shingle body 302 of the first shingle 301, thus providing a closure point for the roof and directing any water entering a joint between adjacent shingle bodies 302 downwardly along the roof.

It is generally desirable that the length of the side lap Lsl is at least about 2". In some cases Lsl is at least about 4". In other cases Lsl is at least about 6". In still other cases, Lsl is at least about 8".

In some embodiments, Lsl/Lsb is at least about 6%. Alternatively, Lsl/Lsb can be at least about 8%, at least about 10%, or at least about 15%.

The side lap can take on a variety of geometries as it provides a closure for a roof between adjacent shingle bodies 302. FIG. 5a shows a rectangular side lap 321 similar to that of FIGS. 3b&d and 4a. FIG. 5b shows a trapezoidal side lap 331. In one trapezoidal side lap embodiment, the length of the side lap portion 331 adjacent the butt edge 303 of the shingle 301 is greater than the length of the side lap portion 331 adjacent to the head edge 305 of the shingle 301. One benefit of such an arrangement is that if water were to enter a joint between adjacent such shingles 301, and traverse laterally a distance, on a sloped roof, the water would also be traveling downwardly and there would be more material of the water impermeable sheet 331 to protect the roof from water intrusion before the water drained down the roof onto the top surface of the next course below of shingles 301.

Sealants can also be employed with the side lap to enhance closure of the roof. FIG. 5c shows a continuous line of sealant 351 on the top surface of the side lap 321 near the shingle body 302 that will form a bond with the back surface of an overlying shingle 301, further closing the roof and providing a path directing downward travel of any moisture that may enter the joint between adjacent shingles 301. A second or more line of sealant may also be employed (not shown) as a backup sealant. One or more of the sealant lines may be continuous or discontinuous. FIG. 5d shows an alternative sealant arrangement where lines of sealant 351 are arranged in a chevron-like pattern so that there are no direct lateral paths for intruding water. The sealant lines 351 are arranged so that they direct any water downwardly along the roof. FIG. 5e shows (in phantom) a sealant line 351 on the back surface of the shingle 301 near the second side edge 309 of the shingle 301 opposite that of the side lap portion 321. Such a sealant 351 forms a bond between the back of the shingle 301 and the top surface of the side lap portion 321 of an adjacently installed shingle 301.

It will be understood that other sealants may also be employed in other locations on the shingle such as on top of the shingle body in or near the fastening zone so that a seal is formed between the top surface of the shingle and the bottom surface of an overlying shingle. Sealants can also be employed on the bottom surface of the shingle in the vicinity of the butt edge of the shingle so that a bond can be formed between the bottom surface of the shingle and the top surface of an underlying shingle. Various sealant arrangements can also include sealants on the top of a shingle near the fastening zone and on the bottom of a shingle near the butt edge on the same shingle. Sealants can be arranged so that in an installed state, the sealant lines match and adhere to one another, or alternatively, sealant lines can be arranged to adhere to the other shingle in a complementary location so as to provide an enhanced bond between the shingles. Still other embodiments may include aspects disclosed in U.S. Pat. Pub. 2011/0061326, which is incorporated herein by reference in its entirety.

Mechanical structures can also be provided to the side lap portion to assist in directing water down a roof in the event that it may enter a joint between adjacent shingles. FIG. 6 shows bottom edge schematic views of a number of such treatments. FIG. 6a shows a side lap 321 attached to the bottom surface of a shingle body 302. In FIG. 6b the side lap 321 is provided with a raised ridge 361 to direct water down the roof. The ridge 361 is generally parallel to the first side edge 307 of the shingle body 302 and spaced at least slightly away from the edge 307 of the shingle body 302 so that a channel is formed that may direct water in a downward fashion. FIG. 6c shows another side lap embodiment where a second ridge 363 is provided as a redundancy in case water were able to find its way over the first ridge 361 there would be a second barrier forming another channel to direct moisture down the roof. FIG. 6d shows another embodiment where the first end 323 of the side lap 321 has a folded over J-shaped flange 371 effect so that water is directed down the roof. With the J-shaped flange 371, the change of direction provides another level of protection for diversion of water down the roof. FIG. 6e shows a combination of a fold-over flange 371 at the end 323 of the side lap 321 and a raised ridge 361 between the flange stop 371 and the first side edge 307 of the shingle body 302. In FIG. 6e it will be noted that the ridge 361 is formed by a crimped structure such that no additional material is needed to create the ridge. In the case of 6b and 6c, some embodiments include additional material forming the ridged structures 361, 363. In another embodiment (not shown), ridge structures are provided for the side lap that have a chevroned arrangement of a type similar to that shown in FIG. 5d for sealant lines 351 where the shape of the ridge structures directs moisture intrusion down the roof.

FIG. 6f depicts an alternate embodiment having an additional asphalt portion or component 381 (i.e., separate from the shingle body 302) formed on an upper surface of the water impermeable sheet 321. This component 381 may be spaced apart from the shingle body 302 as shown, and may be used to help properly align and orient the sheet 321 with the shingle body 302 during manufacturing. In addition, this component 381 may be used as an alignment feature for adjacent and/or abutting shingles 301.

Figure 7A:

In some embodiments the shingle body is provided with a more than one course exposure zone relative to conventional shingles. FIG. 7a shows a shingle 701 with a shingle body having a double exposure zone 711 and a fastening zone 715. In one aspect the larger format shingle body is provided by attaching the two courses 702a and 702b to one another with an appropriate adhesive 704 as depicted in the side edge view of FIG. 7g, where the adhesive 704 is located in what would be the fastening zone of the lower course shingle 702b that attaches the lower shingle 702b to lower butt end 703 of the upper course shingle 702a so that a shingle 701 comparable to two courses results.

Figure 7B:
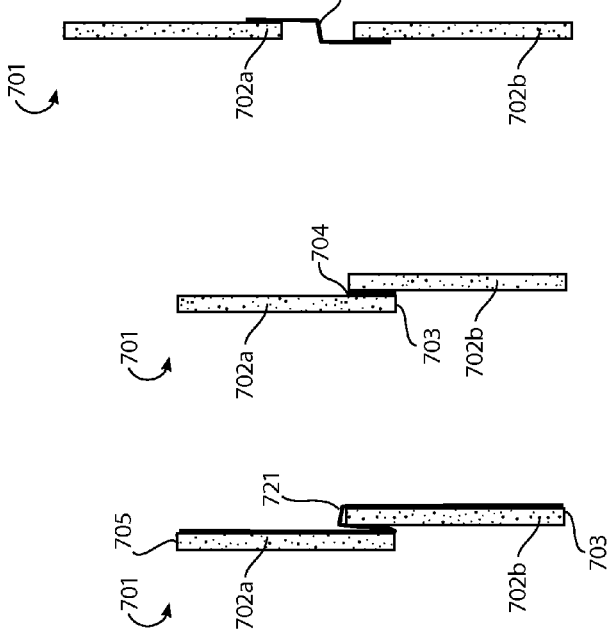
Figure 7C:
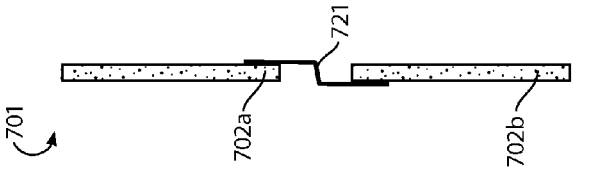
Figure 7D:
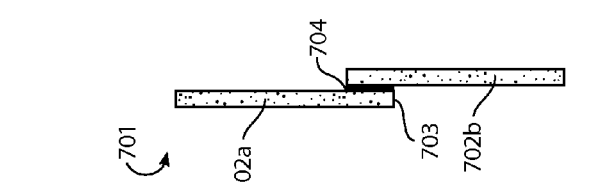

FIG. 7b shows an embodiment where a pair of shingle bodies 702a, 702b is arranged as one shingle body above the other and a foldable water impermeable sheet 721 or structure connects the two shingle bodies 702a, 702b. The water impermeable sheet 721 is attached to the back of the lower portion 702b near the butt edge 703 of the upper shingle body 702a and the back of the upper portion 702a near the head edge 705 of the lower shingle body 702b in FIG. 7c. The foldable, and in some cases flexible, sheet 721 allows the upper shingle 702a to be brought forward and down so that the butt end 703 of the upper shingle body 702a overlies the fastening zone 715 of the lower body 702b to present a two course exposure shingle 701 as depicted in FIG. 7d. Such a foldable aspect of the connector sheet 721 in this embodiment allows the lower shingle body 702b of the dual course shingle 701 to be securely fastened to the roof via its fastening zone 715 prior to bringing the upper course shingle body 702a down and into place. The connector sheet 721 prevents moisture intrusion between the upper and lower shingle bodies 702a, 702b of the dual course shingle 701. An optional sealant may be employed to further secure the upper and lower shingle bodies. Such a sealant may be provided on the connector sheet so that when folded in place, the sealant engages the fastening zone of the lower shingle body. Alternatively, the optional sealant may be provided in the fastening zone of the lower shingle body so that when the upper shingle body is brought into position the sealant assists in securing it in place in addition to fasteners through the fastening zone of the upper shingle body holding the shingle in place on the roof.

Figure 7E:
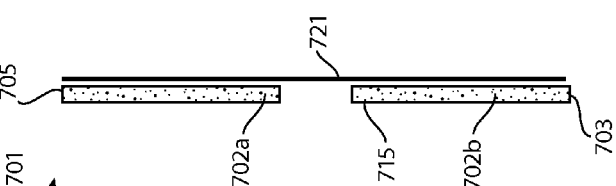
Figure 7F:
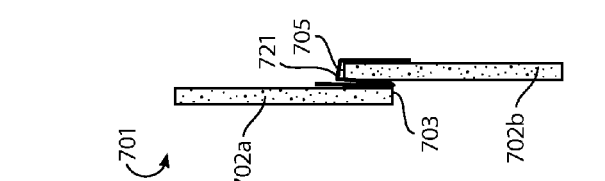
Figure 7G:
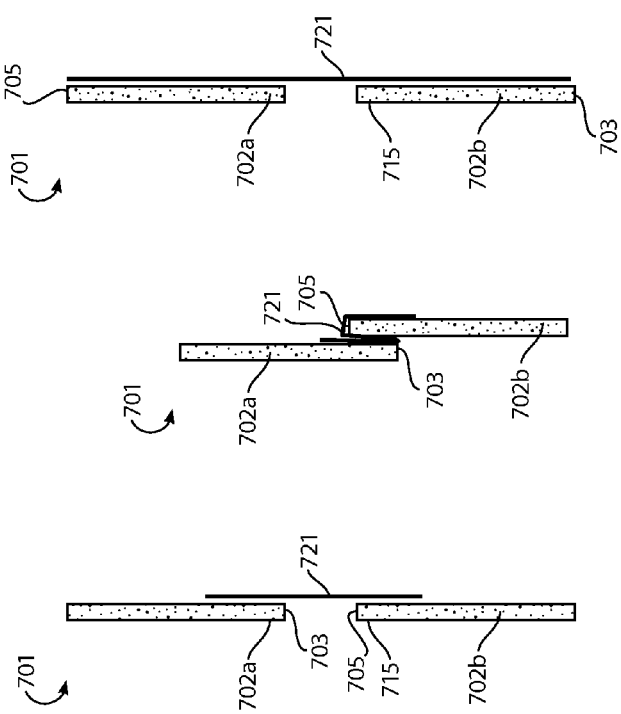
Figure 7H:
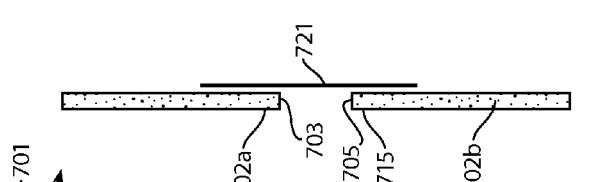

FIGS. 7e and 7f show a similar shingle 701 where the connector sheet 721 extends upwardly to proximate the head edge 705 of the upper shingle body 702a and downwardly to proximate the butt edge 703 of the lower shingle body 702b. It will be understood that the shingles of FIG. 7 are also equipped with a water impermeable sheet side lap portion 721 for ensuring closure of the roof structure on installation. In some embodiments of FIGS. 7e and 7f, the side lap sheet 721 comprises the same sheet as the connector sheet 721. However, the side lap sheet and the connector sheet may be two different sheets, and may overlap each other or be spaced apart from each other. FIG. 7h illustrates an embodiment where the water impermeable sheet 721 overlays one of the two or more courses (e.g., the lower course 702b) and underlays the other of the two or more courses (e.g., the upper course 702a), while joining the two courses together as a single roofing shingle 701 that simulates two courses.

FIG. 8 shows examples of shingles 801 having laminated shingle bodies 802 and water impermeable sheet side lap portions 821 as separate parts in FIGS. 8a and 8b, and assembled in FIGS. 8c and 8d. FIGS. 8a and 8c have rectangular side laps 821. FIGS. 8b and 8d have a trapezoidal side lap 831. It will be understood that the side lap water impermeable sheet may take on a variety of shapes as long as it provides material coverage beneath the end of an adjacent shingle to close the roof. It will also be understood that the portion of the water impermeable sheet may extend beneath the shingle body 802 as described above with reference to FIG. 4. Further, the water impermeable sheet may include a reinforcement so that a level of improved wind resistance and/or impact resistance is provided as described in U.S. Pat. No. 7,537,820 and its patent family. In one embodiment the reinforcement is a part of the water impermeable sheet itself. In another embodiment the reinforcement is made up of an additional sheet built into the roofing product construction. For example, in an embodiment where the water impermeable sheet side lap portion extends behind the side edge of the shingle body for attachment as in the case where length Lwis is sufficiently greater than length Lsl, and Lwis<Lsb, so that it enables attachment to the shingle body, a reinforcement is provided to the shingle body having a length comparable to Lsb.

FIG. 9a shows three shingles 801 of FIG. 8c having shingle bodies 802 and water impermeable sheet side lap portions 821 arranged in overlapping shingle fashion with a lateral offset as they may be installed upon a roof. FIG. 9b shows an additional set of three such shingles 801 arranged so that there are three courses of two shingles 801, the courses being laterally offset from one another and the side lap portion 821 of the right shingle in a given course being overlaid by the rightward end 809 of the adjacent shingle 801. FIG. 9c shows in phantom the parts of the underlying portions of the shingle 801 that are not exposed. The side lap portion 821 is seen to provide coverage to the roof under the joints between adjacent shingle bodies 802 such that any moisture intrusion between the joints would be directed down the roof and the roof would be closed.

FIG. 10a shows components for a shingle 1001 including a water impermeable sheet side lap portion 1021 and two laminated shingle bodies 1002, each shingle body 1002 having a fastening zone 1015 and an exposure zone 1011. FIG. 10b shows such a shingle 1001 assembled. In some embodiments, as described above, the water impermeable sheet 1021 may be located near a side 1007 of the shingle body 1002, extend beyond the edge 1007 and terminate not far from the edge 1007 of the shingle body 1002 near its attachment thereto. Optionally the side lap portion water impermeable sheet 1002 may be present well into or behind the shingle body 1002, even in some instances having a length equal to that of the shingle body 1002 or longer, having a length equal to Ltot for the shingle 1001.

FIGS. 10c through 10j depict side edge views of alternative placements of the water impermeable sheet 1002 in the shingle construction for the two course look shingle 1001 of FIG. 10b.

In 10c, the water impermeable sheet 1021 is behind the shingle bodies 1002a, 1002b that are attached one to another at the apparent fastening zone 1015 of the lower shingle body 1002b. In FIG. 10d the water impermeable sheet 1021 is arranged similarly to that shown in FIGS. 7e and 7f.

In FIGS. 10e through 10j, the water impermeable sheet 1021 extends beyond the upper head edge 1005 or below the lower butt edge 1003 of the shingle 1001. The shingle 1001 of FIG. 10e has an extension 1022 of the water impermeable sheet 1021 above the head edge 1005 of the shingle body 1002a. In FIG. 10f the upper extension 1024 folds over the top of the head edge 1005. In FIG. 10g, the water impermeable sheet 1021 has further extension 1026 that folds back up to lend itself as a dam against water intrusion between adjacent installed courses of shingles 1001.

In FIGS. 10h, 10i and 10j there is a lower extension 1028 of the water impermeable sheet 1021 that folds back to provide blockage to water. In one aspect of this embodiment with particular reference to FIG. 10h, the lower extension 1028 also serves as an attachment means where by during installation, the shingle 1001 is presented face down on the roof with the lower extension 1028 aligned with the fastening zone 1015 of the underlying already installed course of shingles 1001. A fastener is applied through the extension 1028 and into the fastening zone 1015 of the underlying shingle 1001 and the shingle 1001 is folded to an upwardly facing position and the shingle 1001 is further fastened in place via its fastening zone 1015. A roofing shingle, having a nail down strip attached to a main portion by flexible strip and attached to roof decking, where the main portion part is folded up and over the nail down strip, and the nail down strip is integral portion of shingle is disclosed in US patent application 2006/0201094A1. The shingle 1001 of FIG. 10i has a further downward fold 1029 of the lower extension 1028 of the water impermeable sheet 1021 that may further serve to block water intrusion beneath the installed shingles 1001. In addition to the downward extension 1028 of the water impermeable sheet 1021, the shingle 1001 of FIG. 10j also has an upward extension 1026 with a forward fold so that the lower extension 1028 and the upper extension 1026 of the impermeable sheet 1021 may interlock to provide a further barrier to moisture.

Figure 11:
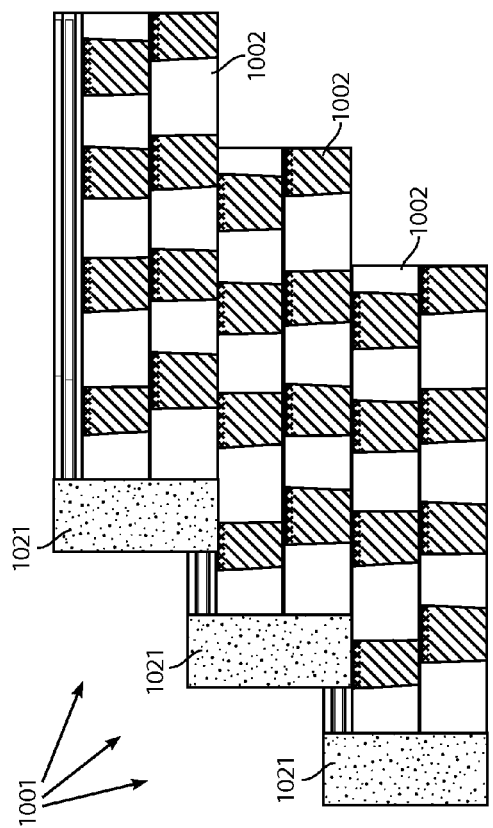
FIGS. 11 and 12 are plan views depicting installation of courses of embodiments of shingles.
Figure 12:
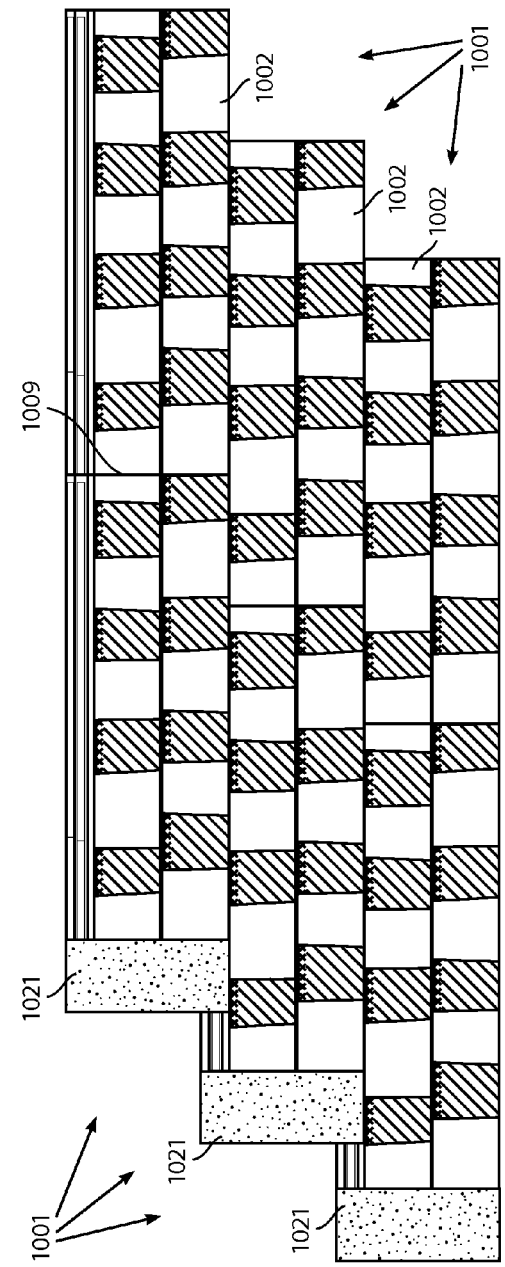

FIG. 11 shows an offset arrangement of three shingles 1001, each shingle 1001 presenting a dual course effect where the shingles 1001 have shingle bodies 1002 and water impermeable sheet side lap portions 1021 arranged in overlapping shingle fashion with a lateral offset as they may be installed upon a roof analogously to FIG. 9a. FIG. 12 shows an additional set of three such shingles 1001 arranged so that there are three courses of two shingles 1001, the courses being laterally offset from one another and the side lap portion 1021 of the right shingle in a given course being overlaid by the rightward end 1009 of the adjacent shingle 1001. The underlying side lap portions 1021 provide coverage to the roof under the joints between adjacent shingle bodies 1002 such that any moisture intrusion between the joints is directed down the roof and the roof is closed.

FIG. 13 shows examples of another type of shingle 1301 where a water impermeable sheet side lap portion 1321 can be used to provide a shingle 1301 having the appearance of a conventional shingle or shingles, yet take advantage of constructions that employ lesser amounts of conventional shingle materials. FIG. 13a shows a plan view of a product commercially available as Centennial Slate™, available from CertainTeed Corporation, Valley Forge, Pa. FIG. 13b shows a shingle body 1302 with a portion of the headlap 1313 omitted relative to the conventional shingle of FIG. 13a. FIG. 13c shows a shingle 1301 with reduced headlap portion 1313 equipped with a water impermeable sheet side lap portion 1321. FIG. 13d shows a two course look shingle 1301 with a side lap portion 1321. FIG. 13e shows another two course look shingle 1301 with a side lap portion 1321 where the two course shingle bodies 1302a, 1302b are laterally offset in the shingle 1301. FIG. 13f shows a laterally offset two course look shingle 1301 with a side lap portion 1331, the side lap portion 1331 having a shaped end to accommodate the offset and provide more side lap protection toward the lower butt edge 1305 of the shingle.

The water impermeable sheet making up at least the side lap portion of the shingle can be composed of a variety of different materials. In one aspect it is made up of materials used in conventional roofing membranes such as EPDM or TPO thermoplastic or bituminous membranes commonly used on low slope roofs. In another aspect it is made up of materials such as roofing underlayments such as asphalt coated felt, non-asphaltic fiberglass underlayments or synthetic underlayments. Exemplary synthetic underlayments include, but are not limited to TITANIUM™ synthetic roofing underlayment from InterWrap, Mission, British Columbia, Canada, Tri-Flex® from Grace Construction Products, Cambridge, Mass., Summit® Synthetic Underlayment from Atlas Roofing Corporation, Atlanta, Ga., and the like. In a further aspect it is made up of a bituminous underlayment material such as one of the WinterGuard™ family of products available from CertainTeed Corporation, Valley Forge, Pa.

In another aspect the water impermeable sheet can be made of a plastic film or sheet of appropriate size, shape, thickness and flexibility to act as a side lap portion of the shingle. Suitable polymers making up such a film or sheet include acrylic sheet, polyvinylchloride sheet, nylons, polyimides, polyurethanes, polyureas, polyolefin copolymers and ionomers, and the like. The films or sheets may be coextruded with protective layers. For example, a polyvinylchloride sheet may include a layer of ASA or AES on the top surface of the side lap portion. The sheet may be flexible or rigid. Polymer coated fabrics may also be employed.

In some embodiments a protective coating of high durability is provided for zones that may experience some exposure to the elements, such as, for example, in the area of the top surface of the side lap portion adjacent to the side edge of the shingle body. Suitable materials for such protective treatments include fluoropolymer coatings such as Kynar based coatings, acrylic coatings, polyurethanes, acrylic urethanes, and the like.

In some embodiments the water impermeable sheet includes a metal foil or sheet. In further embodiments, the impermeable sheet includes a metallized polymer film or sheet, such as, for example a metallized polyester sheet.

Further, the water impermeable sheet can be provided with or without reinforcements of glass, polymeric, carbon or ceramic fibers. The water impermeable sheet can include polymers reinforced with nanomaterials such as nanoparticulate fillers or nanofibers. A fabric-like reinforcement may make up a portion of the water impermeable sheet, such as a woven, a nonwoven, a spunbond, a knitted, a netted, or scrim fabric web or sheet.

Additional ingredients suitable for inclusion in the water impermeable sheet include additives such as colorants, UV stabilizers, thermal stabilizers, antioxidants, antimicrobials and fire retardants. Flame retardants are materials that inhibit or resist the spread of fire. These can be separated into several categories:

Minerals such as asbestos, compounds such as aluminum hydroxide, magnesium hydroxide, antimony trioxide, various hydrates, red phosphorus, and boron compounds, mostly borates.

Tetrakis (hydroxymethyl) phosphonium salts, made by passing phosphine gas through a solution of formaldehyde and a mineral acid such as hydrochloric acid, are used as flame retardants for textiles.

Synthetic materials such as halocarbons. These include organochlorines such as polychlorinated biphenyls (PCBs), chlorendic acid derivates (most often dibutyl chlorendate and dimethyl chlorendate) and chlorinated paraffins; organobromines such as polybrominated diphenyl ether (PBDEs), which be further broken down into pentabromodiphenyl ether (pentaBDE), octabromodiphenyl ether (octaBDE), decabromodiphenyl ether (decaBDE) and hexabromocyclododecane (HBCD). Synthetic flame retardant materials also include organophosphates in the form of halogenated phosphorus compounds such as tri-o-cresyl phosphate, tris(2,3-dibromopropyl)phosphate (TRIS), bis(2,3-dibromopropyl)phosphate, tris(1-aziridinyl)-phosphine oxide (TEPA), and others.

Flame retardants can have various mechanisms of function to retard progress of flames and burning of compositions including them. For example, some compounds break down endothermically when subjected to high temperatures. Magnesium and aluminum hydroxides are an example, together with various hydrates, such as alumina trihydrate. The reaction removes heat from the surrounding, thus cooling the material. Care is needed with such flame retardants during processing so as to remain below the decomposition temperature while a product is being manufactured. An alternative mechanism for flame retardance is the dilution of fuel. Inert fillers such as talc or calcium carbonate, act as diluents, lowering the amount of the combustible portion of the material, thus lowering the amount of heat per volume of material that can be produced while burning. Other flame retardants can act through a thermal shielding mechanism. A way to stop spreading of the flame over the material is to create a thermal insulation barrier between the burning and unburned parts. Intumescent additives can be employed to turn the polymer into a carbonized foam, which separates the flame from the material and slows the heat transfer to the unburned fuel. Yet another mechanism for flame retardant action is the dilution of gas phase reactants in the flame. Inert gases such as carbon dioxide and water produced by thermal degradation of some materials act as diluents of the combustible gases, lowering their partial pressures and the partial pressure of oxygen, and slowing the reaction rate to inhibit burning. Still another mechanism for flame retardance is gas phase radical quenching. Chlorinated and brominated materials undergo thermal degradation and release hydrogen chloride and hydrogen bromide. These react with the highly reactive H. and OH. radicals in the flame, resulting in an inactive molecule and a Cl. or Br. radical. The halogen radical has much lower energy than H. or OH., and therefore has much lower potential to propagate the radical oxidation reactions of combustion. Antimony compounds tend to act in synergy with halogenated flame retardants.

In another aspect, the water impermeable sheet includes recycled content. In the case of polymeric based water impermeable sheet materials, the sheet can include various amounts of recycled post-consumer, pre-consumer, post-industrial or industrial waste polymeric materials from the waste stream. In the case of a bituminous membrane based water impermeable sheet, the sheet can include recycled shingle material from industrial sources, or even from shingle tear-off sources.

The water impermeable sheet is attached to the shingle body so as to provide a side lap portion to close the roof to moisture and the elements when it is installed on a roof. Various methods of attachment are suitable. Among such methods are the use of adhesives, sealants, and welds. Bituminous adhesives may be used to attach the sheet to the shingle body. Other adhesives include polyurethanes, epoxies, butyl adhesives, rubber resin adhesives, and the like. The adhesives may be reactive two part or one part adhesives. In some cases hot melt adhesives are employed. In still other cases, pressure sensitive adhesives may be used to bond the water impermeable sheet to the shingle body. Thermal, sonic or vibrational welding may be employed to fuse the parts together. Additionally, mechanical attachment methods may also be used in some embodiments to secure the water impermeable sheet and the shingle body one to another. Mechanical attachment approaches include mechanical fasteners, staples, sewing, stitching, rivets, grommets, and the like.

Side lap treatments and arrangements have been described that allow the manufacture and provision of functional shingles having the look and appearance of conventional shingles, yet make use of lower quantities of conventional shingle material by way of reduction of the volume of headlap material employed in an asphaltic or bituminous shingle. Structured elements incorporated in the side lap portion include ridges, troughs, curls, flanges, and other shapes varied dimension that act to provide channels and pathways for water that may intrude between adjacent shingles on the roof and direct the water downwardly to pass over the lower shingles on the roof as the roof drains. Sealants are also useful features that can be included in continuous, discontinuous, and chevroned fashion in the shingle construction. Multiple dams of sealant can be used. In one embodiment, the back of the water impermeable sheet includes full coverage of a sealant or adhesive for bonding the shingle to the roof deck. The attachment of the water impermeable sheet material can be made to the bottom of the shingle body, or via interlamination between layers of a laminated shingle body. In some instances, the sheet imparts a degree of impact resistance to the shingle body. The water impermeable sheet can be composed of different materials having different functionality as needed beneath the exposure zone of the shingle or in the attachment zone.

In still other embodiments, a roofing shingle may comprise a shingle body having a buttlap portion with a butt edge and a headlap portion with a head edge, a first side edge and a second side edge. An exposure zone extends from the butt edge toward the headlap portion that is configured to be exposed to the environment when the shingle is installed on a roof. A water impermeable sheet (WIS) may be attached to the shingle body. The WIS may have a width, length, first end and second end, the width extends from approximately the head edge to approximately the butt edge of the shingle body, the length extends from the first end to the second end, at least a portion of the length extends beyond the first side edge of the shingle body by at least about 2 inches, and the WIS is formed from a different material than the shingle body.

Embodiments of the first end of the WIS may extend beyond the first side edge, such that a first distance between the first end and the first side edge is at least about 10% of a second distance between the first end of the WIS and the second side edge of the shingle body. The length of the WIS may extend beyond the first side edge of the shingle body by at least about 4 inches, at least about 6 inches, or at least about 8 inches. The length of the WIS may extend approximately to the second side edge of the shingle body, and the second end of the WIS may be proximal to the second side edge of the shingle body. The second end of the WIS may be offset from the second side edge of the shingle body by an amount comparable to an extension of the first end of the WIS beyond the first side edge of the shingle body.

Some embodiments of the shingle body may emulate two or more courses of conventional shingles. The roofing shingle may be selected from the group consisting of: the two or more courses are secured to each other with an adhesive, the WIS is foldable and connects the two or more courses, the WIS is attached to backs of the two or more courses, the WIS allows an upper course to overlay a lower course, the WIS only overlays portions of the two or more courses, the WIS overlays entire surfaces of the two or more courses, and the WIS overlays one of the two or more courses and underlays the other of the two or more courses. Other embodiments of the roofing shingle may be selected from the group consisting of: the width of the WIS extends beyond the head edge or beyond the butt edge of at least one of the two or more courses, the WIS has an extension that folds over at least one of the two or more courses, the two or more courses are laterally offset from each other, and the WIS has a shaped portion to accommodate the lateral offset of the two or more courses.

Embodiments of the WIS may include a structural element having a raised portion configured to provide a dam against moisture intrusion. The structural element may be selected from the group consisting of a rigid structure and an asphaltic component formed on a top surface of the WIS. The roofing shingle may be selected from the group consisting of: the structural element is a raised ridge that is generally parallel to the first side edge of the shingle body, the structural element comprises a plurality of ridges, the structural element comprises a folded-over J-shaped flange, the structural element comprises a folded-over J-shaped flange and a raised ridge between the flange and the first side edge of the shingle body, and the structural element is a crimped structure such that no additional material is needed to create the structural element.

Other embodiments of the structural element may include a sealant. The roofing shingle may be selected from the group consisting of: the sealant is continuous or discontinuous, wherein the sealant is on a top surface of the WIS or a back surface of the shingle body, and the sealant comprises a plurality of lines of sealant, wherein the sealant is arranged in a chevron-like pattern. The roofing shingle may further comprise a reinforcement mounted to a lower surface of the shingle body beneath the exposure zone. The WIS may comprise a reinforcement in a portion beneath the exposure zone of the shingle body. The shingle body may comprise a single layer of shingle material or a laminate having a plurality of layers. The shingle body may comprise an asphaltic or bituminous material. The WIS may have a thickness that is less than about 50% of a thickness of the shingle body, less than about 40%, less than about 30%, less than about 20%, less than about 10%, or less than about 5% of the thickness of the shingle body.

Embodiments of the WIS may only extend beyond the first side edge of the shingle body. The WIS may not extend beyond the butt edge or the head edge of the shingle body. The WIS may not extend beyond the buttlap portion or the headlap portion of the shingle body. The WIS may be attached to a lower surface of the shingle body. The second end of the WIS may be offset inwardly from the second side edge of the shingle body by an amount comparable to the portion of the length of the WIS that extends beyond the first side edge of the shingle body.

The WIS may comprise a rectangular side lap or a trapezoidal side lap. The WIS may comprise one or more of EPDM, TPO thermoplastic, bituminous membrane, asphalt-coated felt, non-asphaltic fiberglass underlayment, synthetic underlayment, bituminous underlayment material, plastic film, acrylic, polyvinylchloride, nylon, polyimide, polyurethane, polyurea, polyolefin copolymer or ionomer, ASA, AES, fluoropolymer, polyurethane, acrylic urethane, metal foil, metallized polymer film or a combination thereof. The WIS may comprise one or more of glass, polymeric, carbon or ceramic fiber, polymers reinforced with nanomaterial, woven, nonwoven, spunbond, knitted, netted or scrim fabric, colorant, UV stabilizer, thermal stabilizer, antioxidant, antimicrobial, fire retardant, recycled content or a combination thereof. The WIS may be attached to the shingle body with one or more adhesive, sealant, weld, mechanical attachment or a combination thereof.

Embodiments of a method of making a roofing shingle may comprise forming a shingle body with a buttlap portion and a butt edge, a headlap portion and a head edge, a first side edge and a second side edge, an exposure zone extending from the butt edge toward the headlap portion that is configured to be exposed to the environment when the shingle is installed on a roof; and attaching a water impermeable sheet (WIS) to the shingle body, the WIS having a width, length, first end and second end, the width extends from approximately the head edge to approximately the butt edge of the shingle body, the length extends from the first end to the second end, at least a portion of the length extends beyond the first side edge of the shingle body by at least about 2 inches, and the WIS is formed from a different material than the shingle body.

The attaching may comprise attaching the WIS to the shingle body after the shingle body is fabricated. Attaching may comprise attaching the WIS to the shingle body while the shingle body is being fabricated.

The shingle body may emulate two or more courses of conventional shingles. Attaching may be selected from the group consisting of: securing the two or more courses to each other with an adhesive, folding the WIS and connecting the two or more courses with the WIS, attaching the WIS to backs of the two or more courses, overlaying a lower course with an upper course with the WIS, overlaying only portions of the two or more courses with the WIS, overlaying entire surfaces of the two or more courses with the WIS, and overlaying one of the two or more courses and underlaying the other of the two or more courses with the WIS. Attaching may be selected from the group consisting of: extending the width of the WIS beyond the head edge or beyond the butt edge of at least one of the two or more courses, folding over an extension of the WIS over at least one of the two or more courses, laterally offsetting the two or more courses from each other, accommodating a lateral offset of the two or more courses with a shaped portion of the WIS, and forming an asphaltic component on a top surface of the WIS and using the asphaltic component to align the WIS with the shingle body.

Embodiments of a method of installing roofing shingles may comprise providing a plurality of roofing shingles, each shingle having a shingle body, a water impermeable sheet (WIS) attached to the shingle body and extending therefrom as a sidelap, and the WIS is formed from a different material than the shingle body; and fastening the roofing shingles to a roof deck with fasteners in horizontal courses such that adjacent ones of the shingle bodies in a single horizontal course only laterally abut each other, only overlap adjacent WIS, and do not overlap each other.

The method may further comprise extending the WIS from the shingle body only as the sidelap and not as a headlap. The method also may further comprise extending at least some of the fasteners through the WIS as well as the shingle bodies. The method may further comprise fastening the roofing shingles directly to the roof deck with no underlayment between the roofing shingles and the roof deck. Embodiments of the method may further comprise laterally abutting the shingle bodies of the roofing shingles to each other such that the shingle bodies do not overlap each other, and the shingle bodies only overlap the WIS.

All patents and patent applications noted in this disclosure are incorporated by reference herein.

It will be apparent to those skilled in the art that various modifications and variations can be made to the present invention without departing from the scope of the invention. Thus, it is intended that the present invention cover the modifications and variations of this invention provided they come within the scope of the appended claims and their equivalents.

What is claimed is:

1. A roofing shingle, comprising:
a shingle body comprising a buttlap portion with a butt edge and a headlap portion with a head edge, a first side edge and a second side edge, an exposure zone extends from the butt edge toward the headlap portion that is configured to be exposed to the environment when the shingle is installed on a roof; and
a water impermeable sheet (WIS) attached to the shingle body, the WIS having a width, length, first end and second end, the width extends from approximately the head edge to approximately the butt edge of the shingle body, the length extends from the first end to the second end, at least a portion of the length extends beyond the first side edge of the shingle body by at least about 2 inches, such that the WIS only extends beyond the shingle body in a length direction and does not extend beyond the head edge of the shingle body, such that the WIS is only a sidelap and is not a headlap, and the WIS is formed from a different material than the shingle body.

2. The roofing shingle of claim 1, wherein the first end of the WIS extends beyond the first side edge, such that a first distance between the first end and the first side edge is at least about 10% of a second distance between the first end of the WIS and the second side edge of the shingle body.

3. The roofing shingle of claim 1, wherein the length of the WIS extends beyond the first side edge of the shingle body by at least about 4 inches.

4. The roofing shingle of claim 1, wherein the length of the WIS extends approximately to the second side edge of the shingle body, and the second end of the WIS is proximal to the second side edge of the shingle body.

5. The roofing shingle of claim 1, wherein the shingle body comprises an area of two or more courses of conventional shingles.

6. The roofing shingle of claim 1, wherein the shingle body comprises a single layer of shingle material or a laminate having a plurality of layers.

7. The roofing shingle of claim 1, wherein the WIS has a thickness that is less than about 50% of a thickness of the shingle body.

8. The roofing shingle of claim 1, wherein the WIS is attached to a lower surface of the shingle body.

9. The roofing shingle of claim 1, wherein the second end of the WIS is offset inwardly from the second side edge of the shingle body by an amount comparable to the portion of the length of the WIS that extends beyond the first side edge of the shingle body.

10. The roofing shingle of claim 1, wherein the WIS comprises a trapezoidal side lap.

* * * * *

UNITED STATES PATENT AND TRADEMARK OFFICE
CERTIFICATE OF CORRECTION

| | | |
|---|---|---|
| PATENT NO. | : 8,925,272 B1 | Page 1 of 1 |
| APPLICATION NO. | : 13/667349 | |
| DATED | : January 6, 2015 | |
| INVENTOR(S) | : Amatruda et al. | |

It is certified that error appears in the above-identified patent and that said Letters Patent is hereby corrected as shown below:

Title Page, Item (75) Inventor is corrected to read:
-- Anna M. Amatruda, East Norriton, PA (US);
Peter Chihlas, Lansdale, PA (US);
Gregory F. Jacobs, Oreland, PA (US)
Robert L. Jenkins, Honey Brook, PA (US);
Stephen A. Koch, Collegeville, PA (US);
Jennifer A. Millberg, Boston, MA (US);
Richard A. Snyder, Eagleville, PA (US);
Dale H. Walton, Royersford, PA (US); --.

Signed and Sealed this
Second Day of June, 2015

Michelle K. Lee
*Director of the United States Patent and Trademark Office*